United States Patent [19] [11] 3,869,566
Smith [45] Mar. 4, 1975

[54] PULSE-WIDTH-MODULATED CONVERTER FOR TELEVISION SYSTEM

[75] Inventor: Clyde Smith, North Salem, N.Y.

[73] Assignee: Columbia Broadcasting System Inc., New York, N.Y.

[22] Filed: Apr. 20, 1973

[21] Appl. No.: 353,091

[52] U.S. Cl. .......... 178/7.2, 178/DIG. 11, 178/7.3 R
[51] Int. Cl. .......... H04n 5/38
[58] Field of Search ........ 178/7.1, 7.2, 7.3 R, 7.5 R, 178/DIG. 11; 328/63, 258, 267; 323/22, 40

[56] References Cited

UNITED STATES PATENTS 3,510,578 5/1970 Bazin .......... 178/7.1

FOREIGN PATENTS OR APPLICATIONS 1,174,721 12/1969 Great Britain .......... 178/DIG. 11

*Primary Examiner*—Richard Murray
*Attorney, Agent, or Firm*—Martin Novack; Spencer E. Olson

[57] ABSTRACT

This invention is applicable to a television system, for example a television camera system, which includes a source of timing signals that are synchronized in time with blanking intervals which occur between active portions of the video signals generated by said television system. The invention is directed to an improved pulse-width-modulated converter which converts a source of direct voltage to a regulated supply of direct voltage having a minimum of perturbations occurring during active portions of the video. In accordance with the invention there is provided a transformer having primary and secondary windings. Means responsive to the timing signals are provided for generating an alternating voltage. Switching means coupled to the primary winding are responsive to the alternating voltage for alternately applying the unregulated source of direct voltage in opposite relative polarities across the primary winding. A rectifier is coupled to the secondary winding and filter means receive the output of the rectifier. Further provided is a pulse generating means responsive to the voltage output level of the filter and the timing signals for generating a series of pulses which are in synchronism with the timing signals and which have widths that vary as a function of the voltage output level. Finally, inhibit means are provided which are responsive to the pulses for inhibiting the application of the unregulated voltage across the primary winding during the pulses.

9 Claims, 3 Drawing Figures

PULSE-WIDTH-MODULATED CONVERTER FOR TELEVISION SYSTEM

BACKGROUND OF THE INVENTION

This invention relates to regulated power supplies and, more particularly, to an improved pulse-width-modulated converter for use in conjunction with a television system.

There are various instances where it is desirable to convert an unregulated source of direct voltage, such as a battery, to a regulated supply of direct voltage. This is conventionally achieved using the circuit known as a pulse-width-modulated DC-to-DC converter. In such a converter the available unregulated DC voltage is chopped to generate an AC voltage which can, in turn, be stepped up or down to a desired voltage level using a transformer. The AC voltage is then filtered to obtain a DC output voltage. Regulation of the output voltage generated by such a system can be achieved by sampling the output voltage level and using the sampled level to control the pulse width of the chopped signal. Variations in the pulse width of the chopped signal affect the generated voltage output level, so the sampled output voltage level acts to stabilize the output voltage under conditions of a varying load or drifts in the original source voltage from a battery.

The described type of DC-to-DC converter, while suitable in many applications, has been found to be troublesome when utilized as part of a television system, such as a portable television camera system. The problem arises because the filtering of the rectified output voltage of the converter is not a perfect operation. Specifically, the transitions of the AC voltage being filtered give rise to residual perturbations in the "filtered" output voltage. Perturbations of this type which occur during active portions of picture video are found to interfere with the video and cause noticeable degradation of an ultimately displayed signal.

Accordingly, it is one object of this invention to provide a pulse-width-modulated converter for use in conjunction with television systems, the converter having a minimum of perturbations occurring during active portions of a video signal.

SUMMARY OF THE INVENTION

The present invention is applicable to a television system, for example a television camera system, which includes a source of timing signals that are synchronized in time with blanking intervals that occur between active portions of the video signals generated by said television system. The invention is directed to an improved pulse-width-modulated converter which converts a source of direct voltage to a regulated supply of direct voltage having a minimum of perturbations occurring during active portions of the video.

In accordance with the invention there is provided a transformer having primary and secondary windings. Means responsive to the timing signals are provided for generating an alternating voltage. Switching means coupled to the primary winding are responsive to the alternating voltage for alternately applying the unregulated source of direct voltage in opposite relative polarities across the primary winding. A rectifier is coupled to the secondary winding and filter means receive the output of the rectifier. Further provided is a pulse generating means responsive to the voltage output level of the filter and the timing signals for generating a series of pulses which are in synchronism with the timing signals and which have widths that vary as a function of the voltage output level. Finally, inhibit means are provided which are responsive to the pulses for inhibiting the application of the unregulated voltage across the primary winding during the pulses.

In a preferred embodiment of the invention means are provided for limiting the width of the pulses so that the pulses are constrained to occur during the blanking intervals. Further features and advantages will become more readily apparent from the following detailed description when taken in conjunction with the accompanying drawings.

DESCRIPTION OF THE PREFERRED EMBODIMENT

Figure 1:
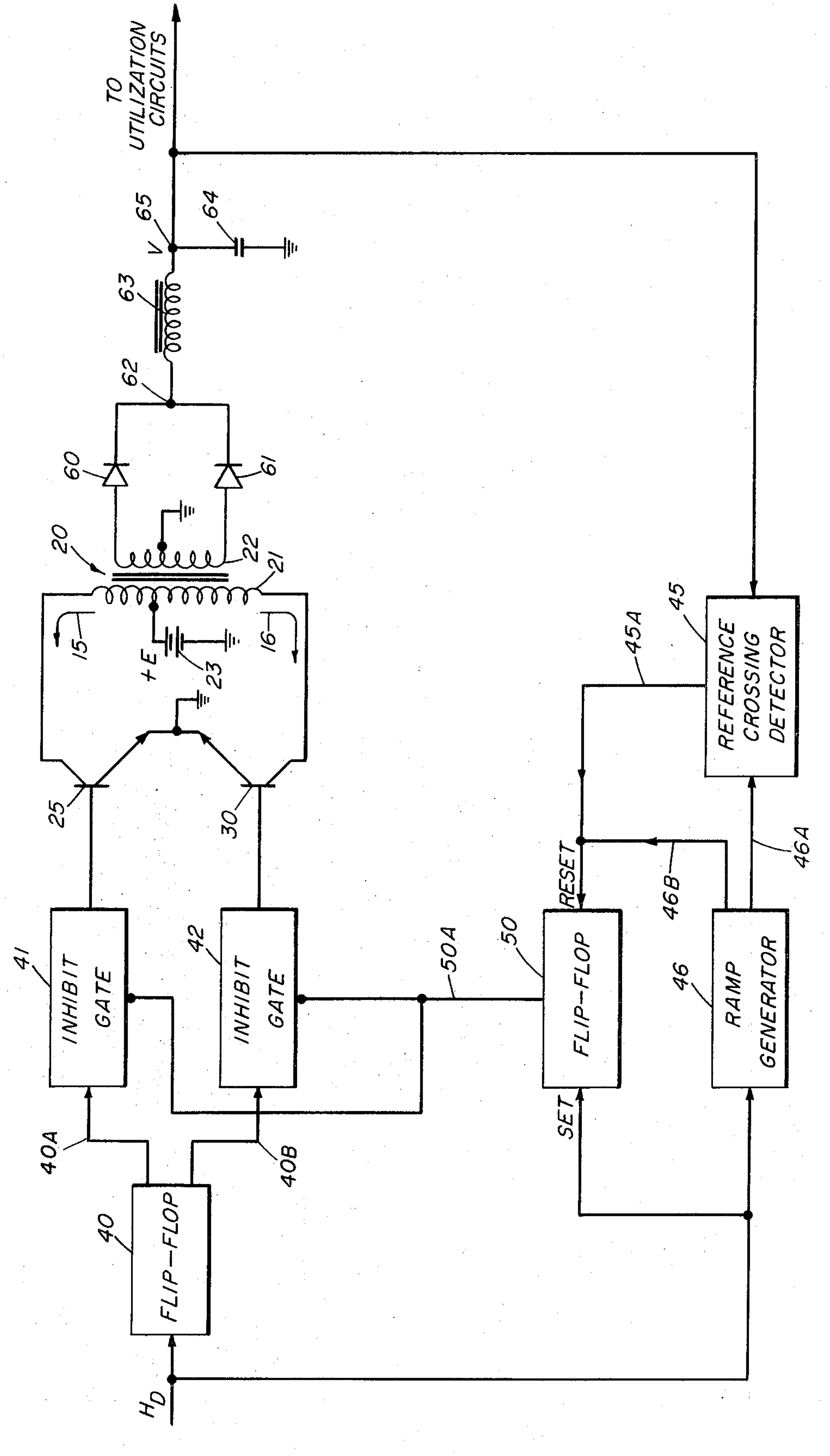
FIG. 1 is a simplified schematic diagram, partly in block form, of an embodiment of a pulse-width-modulated converter in accordance with the invention.

Referring to FIG. 1 there is shown an embodiment of a pulse-width-modulated converter in accordance with the invention. A transformer 20 has a primary winding 21 and a secondary winding 22. The primary winding has a center tap that is coupled to an unregulated source of voltage such as the battery 23 which is indicated as having a nominal voltage of +E. The opposite ends of primary winding 21 are respectively coupled to the collectors of a pair of transistor switches 25 and 30. The emitters of the transistors 25 and 30 are coupled in common to ground reference potential.

A toggle flip-flop 40 receives a synchronizing signal which, in the present embodiment, is the horizontal drive pulse $H_D$ associated with a television camera signal. The complementary outputs of flip-flop 40, which appear on lines designated 40A and 40B, are respectively received by inhibit gates 41 and 42. The inhibit gates operate to inhibit the signals on lines 40A and 40B during the presence of a signal on an inhibit line 50A.

The secondary winding 22 of transformer 20 has a center tap that is coupled to ground reference potential. The opposite ends of winding 22 are respectively coupled through diodes 60 and 61 to a common reference terminal 62. Terminal 62 is coupled through a choke 63 and a capacitor 64 to ground reference potential. The arrangement on secondary winding 22 thus forms a full wave rectifier with the full wave rectified voltage at terminal 62 being filtered by a choke input filter which comprises the choke 63 and capacitor 64. The voltage at reference terminal 65, i.e., between the choke and capacitor, is therefore a DC voltage.

The reference terminal 65 is coupled to the reference input of a reference crossing detector 45. The other input to detector 45 is the output of a ramp generator 46 which is, in turn, triggered by the leading edge of the horizontal drive pulse, $H_D$. A flip-flop 50 receives $H_D$ at its "set" input terminal and receives the output of the reference crossing detector 45 at its "reset" input. The flip-flop 50 generates as an output the inhibit signal on line 50A.

Operation of the circuit of FIG. 1 can be briefly described as follows: Flip-flop 40 is responsive to the leading edge of the horizontal drive pulses to generate out-of-phase alternating voltages on lines 40A and 40B. These signals are utilized to drive the transistor switches 25 and 30 alternately into saturation and cutoff so that the voltage supplied by the battery can cause current to flow alternately through the halves of primary winding 21 in opposite directions as shown by the arrows 15 and 16. The alternation of current flow in winding 21 induces an AC voltage in secondary winding 22 and this voltage is full-wave rectified and filtered to produce a DC voltage which is utilized, in the present embodiment, to drive circuits in the associated television camera system.

Regulation of the voltage level at terminal 65 is achieved by feeding this voltage level back to a circuit which consists of the reference crossing detector 45, the ramp generator 46, and the flip-flop 50. In a manner to be described, the flip-flop 50 generates an inhibit pulse having a width that is proportional to the voltage level at terminal 65. This pulse is then used to inhibit a portion of the time that each of the transistors 25 and 30 would normally be "on" in the absence of the inhibit signal. In this manner, the duty cycle of the alternating current through primary winding 21 is reduced by an amount that is proportional to the width of the inhibit pulse. It follows that the duty cycle of the full wave rectified voltage at terminal 62 is reduced by a proportional amount and thus the filtered DC voltage at terminal 65 is also proportionately reduced. It is thus seen that an increase or decrease in the voltage level at terminal 65 will result in an offsetting change in the width of the inhibit pulse which will, in turn, tend to cause the voltage at terminal 65 to return to its initial desired value. In this manner, instabilities of the voltage level generated by battery 23 are accounted for by regulation as are differences in the load level of utilization circuits in the television camera system. Of particular importance is the fact that the alternating voltage generated at terminal 62 is constrained to have all of its transitions occurred during the horizontal blanking interval. This means that any perturbation in the filtered DC voltage at terminal 65 will occur during the horizontal balnking interval and will not disturb active portions of the video signal. In accordance with the invention, the inhibit pulse, which is determinative of the transitions of the induced AC voltage, is constrained to cause the transitions to occur during the horizontal blanking interval.

Figure 2:
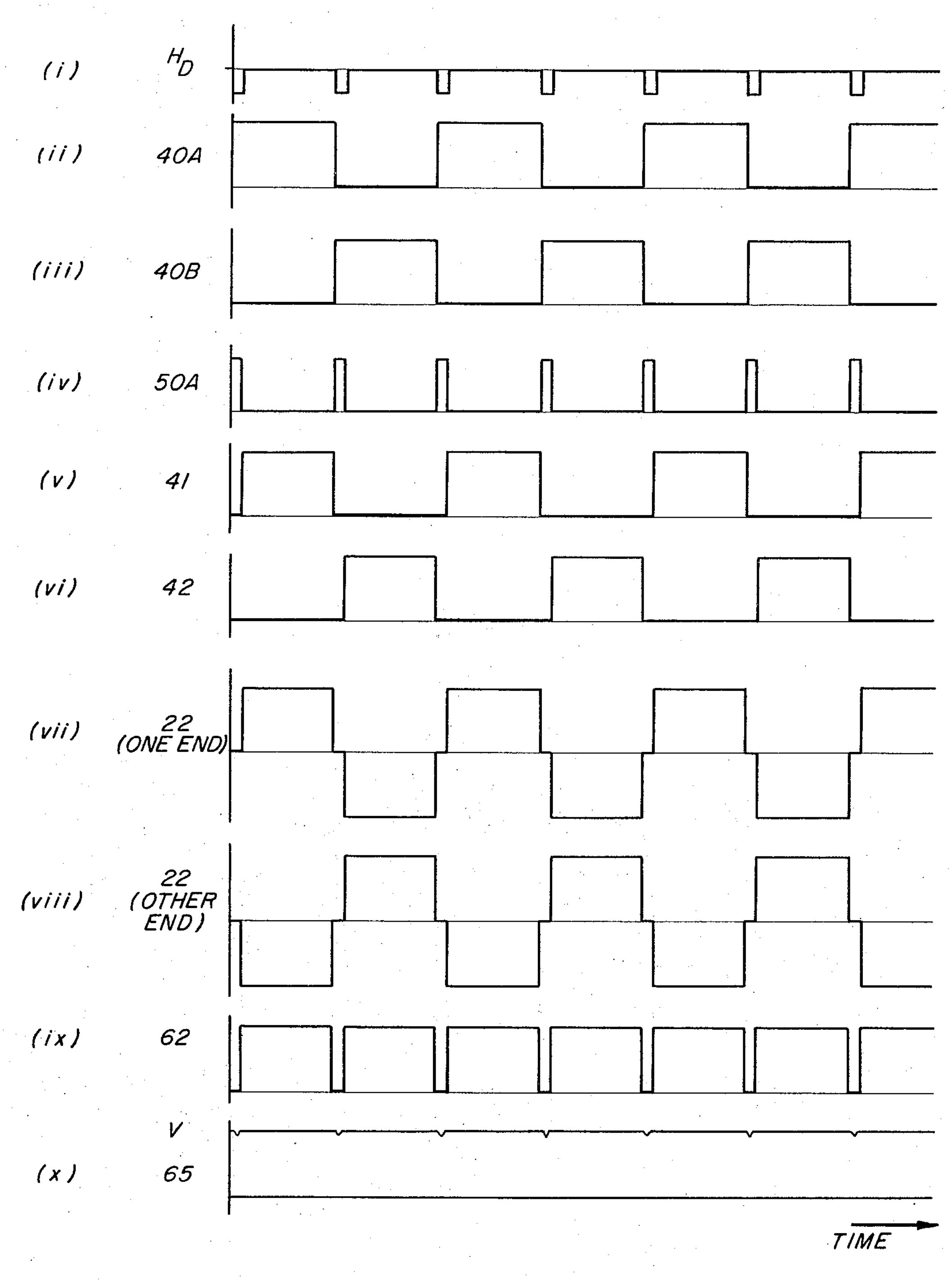
FIG. 2 is a series of timing graphs which are useful for visualizing the operation of the embodiment of FIG. 1.

The graphs of FIG. 2 are useful for visualizing in further detail the operation of the embodiment of FIG. 1. Curve i shows the horizontal drive pulses $H_D$ of a television video signal. Curves ii and iii show the square wave signals on lines 40A and 40B, the state of slip-flop 40 being continuously changed by the leading edge of each $H_D$ pulse. Curve iv shows the inhibit pulses on line 50A and curves v and vi illustrate the outputs of the gates 41 and 42, respectively, these signals having reduced positive excursions as compared to the signals 40A and 40B, the amount of reduction depending on the width of the inhibit signals on line 50A. Graphs vii and viii illustrate the induced voltages, taken with respect to ground reference, that appear at opposite ends of the secondary winding 22. Graph ix shows the full-wave-rectified signal that appears at terminal 62. It can be noted that the "off" time periods of this voltage correspond exactly to the duration of the inhibit pulses shown in graph iv. It is the duration of these enable pulses which determine the duty cycle of the signal at terminal 62 and therefore determine the voltage level of the filtered output at terminal 65, designated as "V" and shown in graph x. It can be further seen that the transitions in the waveform of graph ix occur only at times which correspond to the leading edges of the horizontal drive pulses and the trailing edges of the inhibit pulses. Thus, by constraining the inhibit pulses to occur during the horizontal blanking intervals, the transitions of the voltage waveform 62 are constrained to occur during the horizontal blanking intervals, and it follows that the perturbations due to filtering these transitions, as shown in graph x, are also constrained to occur during the horizontal blanking interval.

Figure 3:
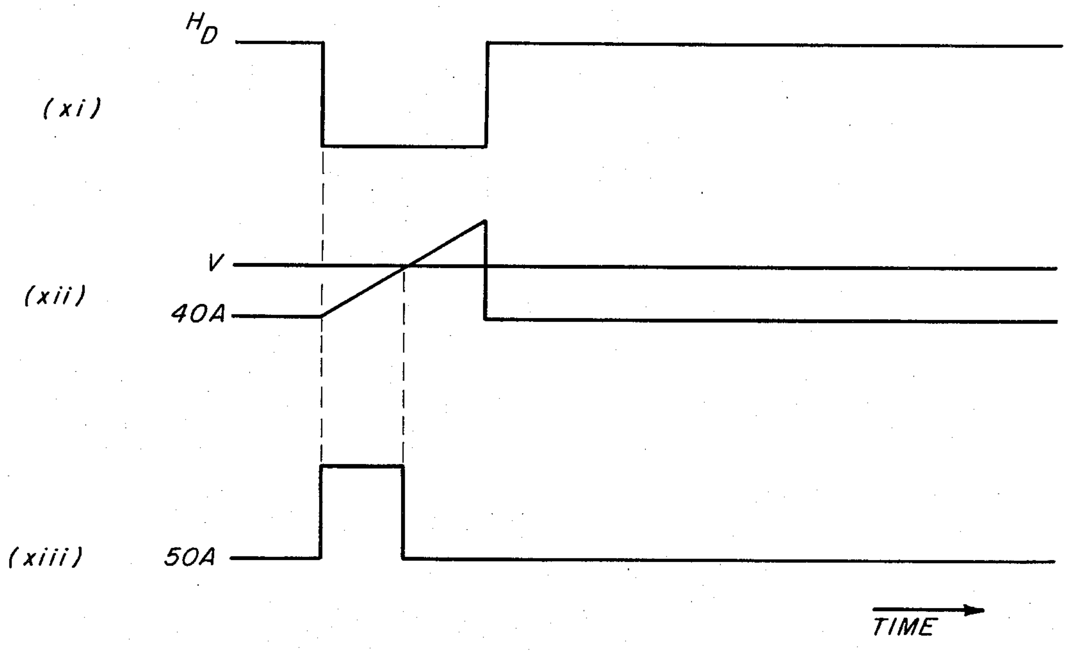
FIG. 3 is a further series of timing graphs that are also useful for visualizing the operation of the embodiment of FIG. 1.

The generation of an inhibit pulse that occurs during the horizontal blanking interval and has a width that is proportional to the voltage V can be described with the aid of the graphs of FIG. 3. Graph (xi) shows a horizontal drive pulse, graph (xii) illustrates the inputs to reference crossing detector 45, and graph (xiii) shows the inhibit pulse output of the flip-flop 50. The leading edge of $H_D$ is utilized to trigger the ramp voltage output on line 46A and also to "set" the flip-flop 50 so as to form the leading edge of the inhibit pulse on line 50A. When the ramp voltage on line 46A equals V, the reference crossing detector 45 generates a signal on line 45A which resets the flip-flop 50 to form the trailing edge of the inhibit pulse on line 50A. Thus, the duration of the inhibit pulse on line 50A is proportional to the voltage V. The particular voltage V at which the equipment will stabilize can be adjusted by selecting a desired steepness of the ramp produced by ramp generator 46. The ramp is also selected to have a duration of less than the horizontal blanking interval; i.e., less than about 11 microseconds. To insure that all transitions occur during the horizontal blanking interval, the negative-going transition of the ramp is utilized as a "safety" reset (line 46B) of the flipflop 50. The available degree of regulation of the disclosed supply can be calculated as 11 microseconds divided by 63.5 microseconds (total horizontal scan time), or about 17 percent.

What is claimed is:

1. In a television system which includes a source of timing signals that are synchronized in time with blanking intervals that occur between active portions of the video signals generated by said television system; an improved pulse-width-modulated converter which converts a source of direct voltage to a regulated supply of direct voltage having a minimum of perturbations occuring during active portions of the video, comprising:

a transformer having primary and secondary windings;

means responsive to said timing signals for generating an alternating voltage;

switching means coupled to said primary winding and responsive to said alternating voltage for alternately applying said unregulated source of direct voltage in opposite relative polarities across said primary winding;

rectifier means coupled to said secondary winding;

filter means for receiving the output of said rectifier means;

pulse generating means responsive to the voltage output level of said filter and said timing signals for generating a series of pulses which are in synchronism with said timing signals and which have widths that vary as a function of said voltage output level;

means for limiting the width of said pulses so that said pulses are constrained to occur during said blanking intervals; and inhibit means responsive to said pulses for inhibiting the application of said unregulated voltage across said primary winding during said pulses.

2. The pulse-width-modulated converter as defined by claim 1 wherein said means for generating an alternating voltage comprises a means for generating first and second complementary alternating voltages.

3. The pulse-width-modulated converter as defined by claim 2 wherein said switching means comprises first and second switches responsive to said first and second complementary alternating voltages.

4. The pulse-width-modulated converter as defined by claim 3 wherein said inhibit means inhibits operation of said first and second switches during said pulses.

5. The pulse-width-modulated converter as defined by claim 4 wherein the width of said pulses is proportional to said voltage output level.

6. The pulse-width-modulated converter as defined by claim 5 wherein said timing signals are horizontal drive signals and said pulse generating means comprises:

means responsive to the leading edge of said horizontal drive signals for forming the leading edge of said pulses;

a ramp generator triggered by the leading edge of said horizontal drive signals;

a reference crossing detector responsive to the output of said ramp generator and said voltage output level; and means responsive to the output of said reference crossing detector for forming the trailing edge of said pulses.

7. The pulse-width-modulated converter as defined by claim 6 further comprising means for limiting the excursion of the output of said ramp generator to occur during the blanking interval.

8. The pulse-width-modulated converter as defined by claim 1 wherein said inhibit means inhibits operation of said switching means during said pulses.

9. The pulse-width-modulated converter as defined by claim 1 wherein the width of said pulses is proportional to said output voltage level.

* * * * *